United States Patent [19]

Sewell

[11] Patent Number: 4,533,589

[45] Date of Patent: Aug. 6, 1985

[54] COMPOSITE MATERIALS

[75] Inventor: John H. Sewell, Aldershot, England

[73] Assignee: The Secretary of State for Defence in Her Britannic Majesty's Government of the United Kingdom of Great Britain and Northern Ireland, London, England

[21] Appl. No.: 633,880

[22] Filed: Jul. 24, 1984

[30] Foreign Application Priority Data

Aug. 25, 1983 [GB] United Kingdom ............... 8322919

[51] Int. Cl.$^3$ ..................... B32B 23/10; B32B 31/12
[52] U.S. Cl. ................................. 428/174; 156/278; 156/307.3; 428/248; 428/260; 428/414; 428/481; 428/537.1; 428/902; 264/241
[58] Field of Search ............... 428/537.1, 902, 414, 428/481, 174, 248, 260; 156/307.3, 278, 313; 264/241

[56] References Cited

U.S. PATENT DOCUMENTS 3,556,897  1/1971  Christoffersen et al. ........ 156/307.3
4,083,744  4/1978  Degens ............................... 156/278

FOREIGN PATENT DOCUMENTS 53-72802   6/1978  Japan ............................... 156/307.3
55-114560  9/1980  Japan ............................... 156/307.3

Primary Examiner—Paul J. Thibodeau
Attorney, Agent, or Firm—William R. Hinds

[57] ABSTRACT

A method is described for the production of composite materials from layers of wood veneer and fibres bonded together and impregnated with resin. The method includes the steps of (a) impregnating at least one layer of reinforcement fibres with a first resin, (b) coating surfaces of at least one layer of wood veneer with a second resin, (c) stacking the at least one resin impregnated reinforcement fibre layer with the at least one layer of resin coated wood veneer and (d) bonding the layers together under conditions of pressure and temperature appropriate to the resins employed in step (a) and step (b) to produce a laminate. Examples of composites are given using carbon fibres and hard wood veneers together with properties thereof.

7 Claims, No Drawings

COMPOSITE MATERIALS

The present invention relates to composite materials, in particular fibre reinforced composites and to methods of making such materials.

Fibre reinforced composites are well known materials which find ever increasing use in many diverse applications such as for example, in the aerospace, automotive and civil engineering fields. Components fabricated from such composites are often required to fulfil critical engineering needs in which high strength, stiffness, lightness and durability are important. Such composites are also utilised in non-engineering, non-structural applications such as for examples decorative panels. In such applications fibre reinforced composites are used rather than traditional materials like steel, aluminum and wood, because of the high strength to weight ratio of fibre reinforced composites allowing the manufacture of lightweight, strong components.

There is a variety of fibres and plastics matrix materials which are used in the manufacture of fibre reinforced composites, the selection of materials for a particular component being determined by the requirements of the component. Typically glass, carbon and Kevlar (trade name) aramid fibres are used as reinforcement in plastics matrix materials such as for example epoxies, polyesters, phenolics, polysulphides and nylons. Although fibre reinforced composites have considerable advantages over traditional materials, making them superior in certain applications, the reinforcement fibres, particularly carbon and Kevlar (trade name) tend to be expensive.

According to one aspect of the present invention a method of making a fibre reinforced composite material includes the steps of (a) impregnating at least one layer of reinforcement fibres with a first resin, (b) coating surfaces of at least one layer of wood veneer with a second resin, (c) stacking the at least one resin impregnated reinforcement fibre layer with the at least one layer of resin coated wood veneer and (d) bonding the layers together under conditions of pressure and temperature appropriate to the resins employed in step (a) and step (b), to produce a laminate.

For the purpose of this specification the term "veneer" includes thickness of wood up to 2 mm but a preferred thickness lies in the range 0.5 mm to 1.0 mm.

The first and second resins are preferably the same resin which may be a thermosetting resin or a thermoplastic resin, but it is preferred that the resin is a thermosetting resin for example an epoxy or a polyester, although other resins may be used. The thermosetting resin may be a hot setting resin requiring the application of heat during the bonding step (d), although the thermosetting resin may also be a cold setting resin. Impregnation of the fibre layers with the resin may be achieved by any convenient method used in the composites art.

The reinforcement fibres may be any that are used in fibre reinforced composites, for example, glass, carbon or aramid, such as Kevlar (trade name), fibres. In certain laminate configurations it may be convenient to use the preimpregnated fibre layers readily available and known as 'prepregs'. In which case step (a) of the process will already be accomplished.

Where the first and second resins are the same it may also be convenient to coat the fibre layers with excess resin and allow the resin excess to coat the faces of the wood veneer layer (step (b)) in the stacking step (c), thus accomplishing steps (b) and (c) simultaneously.

According to a second aspect of the present invention a fibre reinforced composite material comprises at least one layer of reinforcement fibres impregnated with a first resin bonded to at least one layer of wood veneer coated and at least partially impregnated with a second resin.

Preferably the first and second resins are the same.

Fibre layers may be in any desired form consistent with the properties it is desired to achieve, for example, the fibres in a layer may be unidirectional or in the form of woven cloth.

Any number of layers of reinforcement fibres may be used in composites according to the invention but it is preferred that between 1 and 4 layers of fibres are used and preferably 2 or 3 layers.

The wood veneer may be a hard wood, for example, mahogany or oak, or a soft wood, for example, pine. Any number of layers of wood veneer may be used. Each wood layer may be impregnated with a resin solution prior to coating the wood veneer layers, the moisture content of the wood veneer may be reduced by drying and it is preferable that the moisture content of each wood veneer layer is the same in each layer. Where resin solutions are used it may be necessary to coat the wood veneer several times, removing the resin solvent between each coating applied. This of course may also apply to the impregnation of the fibre layer or layer in order to give sufficient resin to obviate void formation.

The sequence in which the wood veneer layers and fibre layers are arranged prior to bonding into a laminate is preferably symmetrical about the centre layer or layers. It is preferred that wood veneer comprises the centre layer or layers of a composite laminate according to the invention. However, where a laminate according to the invention includes an odd number of layers of 5 or more, the centre layer may be a single fibre layer. More than one like layer may be arranged adjacently if desired, for example, three wood veneer layers together and having a fibre layer on each outer face forming a composite having the construction F/W/W/W/F.

Suitable sequences of wood veneer layers and fibre layers according to the invention include F/W/F, F/W/F/W/F, F/W/W/F, F/F/W/W/F/F, F/W/W/W/F, W/F/W, W/F/W/F/W, W/F/F/W and F/W/W/W/F arrangements, where F is a fibre layer and W is a wood veneer layer. The preferred sequences of layers include F/W/F, F/W/F/W/F, F/W/W/F, F/F/W/W/F/F and F/W/W/W/F.

The relative alignment of the various layers in a composite of the invention may be arranged so that the principal grain direction of the wood veneer layers is parallel with the warp direction of the fibre layers where woven fibre layers are used. Each layer of wood veneer and each layer of fibres may be orientated identically, although where two or more wood veneer layers are incorporated the wood veneer layers may be arranged so that their principal grain directions are other than parallel.

It has been found that in general the composites of the present invention have significantly greater flexural breaking strengths and stiffness than equivalent all carbon fibre composites of the same weight, although the composites of the invention tend to be thicker due to the wood veneer layers being thicker than the fibre layers. This increase in strength is an unexpected result of incorporating wood veneer layers in a carbon fibre composite.

When all-fibre composites fail in bending the laminate tends to fail catastrophically in tension, with delamination. Unexpectedly however, when composites of the invention fail in bending no such delamination occurs and failure is in compression. It is though that the interlaminar shear strength of composites of the invention may be greater than those of all-carbon fibre composites which may account for the non-catastrophic failure and non-delamination of the composites of the invention in bending.

Composites according to the invention are considerably cheaper than all carbon fibre composites, due to the use of fewer expensive fibre layers in the composites of the invention and the use of cheaper wood layers. Wood veneer is, for example, as much as 30 times cheaper than carbon fibre in the case of mahogany. Thus the materials cost of composites of the invention are between about half to two thirds the cost of all carbon-fibre composites of the same weight. Considering that the composites of the invention are also stiffer and stronger than all carbon-fibre composites, on an equal weight basis, it will be appreciated that the composites of the invention offer significant advantages over all carbon fibre composites.

It is possible to thoroughly impregnate the wood veneer layers with resin during the bonding step in such a way that the resin thoroughly penetrates the wood veneer and forms a coherent layer on the outer surface or surfaces. The problem of moisture ingress, resultant loss of strength and rotting associated with wood structures may be diminished by composites of the invention since impregnated wood layer or layers would be less susceptible to moisture uptake than unimpregnated layers. In addition, when the outer layer or layers of a composite according to the invention comprise soft wood veneer, the composite may be contoured and shaped by moulding during the bonding step. It has been found that the scratch resistance of the surfaces of a composite of the invention made under compression, which has an outer layer of compressed soft wood, is greater than that of an uncompressed hard wood laminate.

The present invention will now be described by way of Example.

EXAMPLE 1

Honduras Mahogany veneer about 1.00 mm thick was cut into 10 cm×5 cm pieces. Carbon fibre cloth having a 4/1 satin weave about 0.3 mm thick was cut into slightly larger pieces and completely impregnated with Epikote 828 (trade name) epoxy resin 10 mixed with Ancamine A.C. (trade name) hardener in a 2:1 ratio the mixture having a gel time of about 10 minutes. The same resin/hardener mix was used to coat the mating surfaces of the veneer. The various layers were laid up in various sequences as detailed in Table 1 and placed on a vacuum table and compressed at atmospheric pressure for about ½ hour at room temperature, followed by heating at about 60° C. for about 2 hours under a light load to prevent buckling.

For comparison purposes laminates of only resin impregnated carbon fibre were also made under the same conditions (Table 1).

Test specimens were prepared by cutting strips about 1.7 cm wide and 9 cm long from the composite panels. These were tested in 3-point bending (7.7 cm span) in an Instron (trade name) machine. From the load/deflection curve the flexural modulus was calculated and the flexural strength determined from the breaking load. Densities were calculated prior to cutting the composite panels into strips. The results of these tests are also given in Table 1.

TABLE 1

Flexural properties of carbon fibres and carbon fibre/wood laminates

| Sample | Lay-up | Density (gcm$^{-3}$) | Flexural Modulus (kN cm$^{-2}$) | Flexural Strength (kN cm$^{-2}$) | Number of Specimens tested |
|---|---|---|---|---|---|
| 1 | F/F/F | 1.324 | 4336 | 53.98 | 25 |
| 2 | F/F/F/F | 1.315 | 4444 | 61.31 | 20 |
| 3 | F/M/F ↑ | 0.946 | 3392 | 35.29 | 25 |
| 4 | F/M/M/F ↑ → | 0.830 | 2611 | 27.30 | 20 |
| 5 | F/W/F ↑ | 1.040 | 3810 | 53.49 | 2 |
| 6 | E/O/F ↑ | 1.080 | 3489 | 48.62 | 2 |
| 7 | F/C/F ↑ | 1.080 | 3816 | 51.51 | 2 |
| 8 | F/S/F ↑ | 1.140 | 4545 | 58.08 | 2 |
| 9 | F/W/W/W/F ↑ → ↑ | 0.930 | 2873 | 31.89 | 2 |
| 10 | F/O/O/O/F ↑ → ↑ | 0.970 | 3060 | 36.76 | 2 |
| 11 | F/C/C/C/F ↑ → ↑ | 0.940 | 2662 | 34.38 | 2 |
| 12 | F/S/S/S/F ↑ → ↑ | 1.050 | 3537 | 38.93 | 2 |

F = Carbon fibre layer
W = Walnut layer
C = Crown maghogany layer
M = Honduras mahogany layer
O = Plain oak layer
S = Striped mahogany layer
Arrows indicate grain direction

TABLE 2

Comparison of flexural properties of samples having identical weights

| | SAMPLE | | | | | | | | | | | |
|---|---|---|---|---|---|---|---|---|---|---|---|---|
| | 1 | 3 | 5 | 6 | 7 | 8 | 2 | 4 | 9 | 10 | 11 | 12 |
| Relative flexural breaking strength | 1 | 1.28 | 1.61 | 1.35 | 1.43 | 1.45 | 1 | 1.12 | 1.04 | 1.10 | 1.10 | 1 |
| Relative deflection of sample under same load | 1 | 0.47 | 0.55 | 0.67 | 0.62 | 0.61 | 1 | 0.43 | 0.55 | 0.58 | 0.61 | 0.64 |

Flexural moduli and strengths of samples quoted in Table 1 have been calculated so that carbon fibre panels Nos. 1 and 2 can be compared with wood veneer/carbon fibre panels of the same weight in 3-point bending under identical test conditions, using the formula $M = \frac{S^3 W}{4at^3 d}$ where M = flexural modulus, S = specimen span, W = Load a = width, t = thickness, d = deflection; and the formula $\sigma = \frac{3WS}{2at^2}$ where $\sigma$ = flexural strength

EXAMPLE 2

Laminates comprising a single mahogany layer and a single 4/1 satin weave carbon fibre cloth layer were prepared by the method described in Example 1 and bonded to a Ciba-Geigy Aeroweb A1-48-3 (trade name) honeycomb using Epikote 828 (trade name) and Ancamine AC (trade name) in a 2:1 ratio by weight. Some laminates were bonded to the honeycomb via the carbon fibre layer and others via the mahogany layer and compression tests were carried out with 2 cm square indentors. The force required to cause irreversible permanent visible damage to the surface of the laminate/honeycomb structure was determined.

TABLE 3

| Sample | Permanent damage (kg cm$^{-2}$) |
|---|---|
| Honeycomb/wood/CF | 75 |
| Honeycomb/CF/wood | 100 |
| Honeycomb/wood | 20 |

I claim:

1. A method of making a fibre reinforced composite material comprising the steps of (a) impregnating at least one layer of woven or unidirectional carbon or aramid reinforcement fibres with resin, (b) coating surfaces of at least one layer of wood veneer with resin, (c) stacking said at least one layer of resin impregnated reinforcement fibre with said at least one layer of resin coated wood veneer and (d) bonding said layers together under conditions of pressure and temperature appropriate to said resin employed in step (a) and step (b) to produce a composite material.

2. A method according to claim 1 wherein said resin is a thermosetting resin such as an epoxy or a polyester.

3. A method according to claim 1 wherein said bonding step (d) also includes molding the stacked layers into a non-planar shape.

4. A fibre reinforced composite material comprising at least one layer of woven or unidirectional carbon or aramid fibres impregnated with resin and bonded to at least one layer of wood veneer coated with and at least partially impregnated with resin.

5. A fibre reinforced composite material as claimed in claim 4 wherein said resin is an epoxy or polyester resin.

6. A fibre reinforced composite material according to claim 4 wherein said composite material is molded into a non-planar shape.

7. A fibre reinforced composite material as claimed in claim 4 including at least two of said impregnated fibre layers, and wherein opposed exterior faces of the composite material comprise impregnated fibre layers.

* * * * *